United States Patent
Haynes

(10) Patent No.: US 9,442,003 B2
(45) Date of Patent: Sep. 13, 2016

(54) DEROTATION ASSEMBLY AND METHOD FOR A SCANNING SENSOR

(71) Applicant: Raytheon Company, Waltham, MA (US)

(72) Inventor: Evan Haynes, McKinney, TX (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 14/302,186

(22) Filed: Jun. 11, 2014

(65) Prior Publication Data

US 2015/0362363 A1     Dec. 17, 2015

(51) Int. Cl.

| | |
|---|---|
| *G01J 5/02* | (2006.01) |
| *G01J 1/02* | (2006.01) |
| *G01J 1/04* | (2006.01) |
| *G01J 5/04* | (2006.01) |
| *G01J 5/06* | (2006.01) |
| *G03B 17/48* | (2006.01) |
| *G02B 27/64* | (2006.01) |
| *G01J 5/08* | (2006.01) |
| *G01J 5/00* | (2006.01) |

(52) U.S. Cl.
CPC ............ *G01J 1/0271* (2013.01); *G01J 1/0403* (2013.01); *G01J 5/044* (2013.01); *G01J 5/047* (2013.01); *G01J 5/061* (2013.01); *G01J 5/089* (2013.01); *G01J 5/0893* (2013.01); *G02B 27/644* (2013.01); *G03B 17/48* (2013.01); *G01J 2005/0077* (2013.01)

(58) Field of Classification Search
CPC ...... G01J 5/061; G01J 1/0271; G01J 1/0403; G01J 5/044; G01J 5/047; G01J 2005/0077; G03B 17/48; G03B 27/644; G02B 27/644
USPC ......................................................... 250/352
See application file for complete search history.

(56) References Cited

U.S. PATENT DOCUMENTS

| | | | |
|---|---|---|---|
| 3,219,822 A | 11/1965 | Kutzscher et al. | |
| 5,886,450 A | * 3/1999 | Kuehnle | 310/261.1 |

(Continued)

FOREIGN PATENT DOCUMENTS

| | | |
|---|---|---|
| CN | 203376151 U | 1/2014 |
| DE | 2609242 A1 | 9/1976 |
| DE | 4235205 A1 * | 5/1993 |

OTHER PUBLICATIONS

Partial European Search Report issued Dec. 2, 2015 for corresponding European Application No. 15170913.6.

*Primary Examiner* — David Porta
*Assistant Examiner* — Abra Fein
(74) *Attorney, Agent, or Firm* — Renner, Otto, Boisselle and Sklar, LLP

(57) ABSTRACT

An assembly that enables precise mounting of a sensor with improved heat transfer and rotation compensation includes an integrated dewar cooler assembly incorporating the sensor. The dewar assembly is mated to a motorized mount that is controlled to stabilize the rotation of the scene. The sensor is radially aligned relative to the axis of rotation in two adjustment stages. A first stage of adjustment controls the radial position of the sensor inside a bearing. And a second stage of adjustment controls radial translation of the entire assembly outside the bearing. Passive heat transfer is accomplished through a pair of heat sinks that effectively sandwich a hot expander end cap of the dewar, providing multiple heat paths. The entire dewar assembly is rotated during operation to stabilize the scene. The rotating mass of a cooling compressor coupled to the dewar is counterbalanced to avoid torque due to inertia.

19 Claims, 11 Drawing Sheets

(56) References Cited

U.S. PATENT DOCUMENTS

| | | |
|---|---|---|
| 6,135,727 A | 10/2000 | Dreiman et al. |
| 6,315,648 B1 * | 11/2001 | Neer ............................... 451/92 |
| 7,094,043 B2 * | 8/2006 | Skinner ........................ 418/55.6 |
| 2007/0261407 A1 * | 11/2007 | Bin-Nun et al. ................. 60/645 |
| 2009/0284644 A1 * | 11/2009 | McKaughan et al. ......... 348/348 |
| 2010/0200751 A1 * | 8/2010 | Zahn et al. .................... 250/330 |
| 2014/0102954 A1 * | 4/2014 | Gunnerson et al. .......... 209/522 |

* cited by examiner

DEROTATION ASSEMBLY AND METHOD FOR A SCANNING SENSOR

FIELD OF THE INVENTION

The invention is related to optical scanning systems generally, and more particularly for a derotation assembly and method for a scanning sensor.

BACKGROUND

An infrared sensor or other infrared imaging device generally must be cryogenically cooled for optimal performance. Accordingly, the infrared sensor generally is sealed in a vacuum-insulated container called a dewar, which is coupled to a compressor for circulating a cooling fluid through the dewar to maintain a temperature below ambient temperature.

When a sensor is used on a moving platform, such as a vehicle like a ship or an airplane, motion of the platform and motion of the sensor make optimal performance of the sensor more difficult. The relative motion of the sensor to a scene detectable by the sensor creates several problems. To ensure that the scene visible to the sensor is oriented to correspond to a desired coordinate system, rotation of the sensor platform must be compensated for. This is called rotation registration. In addition to maintaining a desired orientation of the scene for the sensor, the scene must be held in a relatively fixed position relative to the sensor's field of view. If the scene is moving relative to the sensor, for example, apparent rotation due to platform rotation, the scene may be blurred or not captured at all.

To date the primary method used to compensate for relative motion between the sensor and the scene is to use a motorized prism through which the scene is viewed. Another method of motion compensation uses algorithms to electronically stabilize the scene. Although faster electronics and better sensors continue to improve this method, it still often depends on the scene moving slowly enough for the sensor to capture an image and for the algorithm to compensate for the motion electronically.

SUMMARY

The present invention provides an assembly that enables precise mounting of a sensor with improved heat transfer and rotation compensation. An integrated dewar cooler assembly incorporating the sensor is mated to a motorized mount that is controlled to stabilize the rotation of the scene. The sensor is radially aligned relative to the axis of rotation in two adjustment stages. A first stage of adjustment controls the radial position of the sensor inside a bearing. And a second stage of adjustment controls radial translation of the entire assembly outside the bearing. Passive heat transfer is accomplished through a pair of heat sinks that effectively sandwich a hot expander end cap of the dewar, providing multiple heat paths. The entire dewar assembly is rotated during operation to stabilize the scene. The rotating mass of a cooling compressor coupled to the dewar is counterbalanced to avoid torque due to inertia.

More particularly, the present invention provides a scanning sensor derotation assembly that includes (a) a housing; (b) an integrated dewar cooling assembly mounted to the housing, the cooling assembly including a sensor mounted in a dewar; (c) a motor coupled to the housing to rotate the housing and the integrated dewar cooling assembly about an axis that passes through a center of the sensor; (d) a compressor fluidly coupled to the dewar, the compressor being mounted to the housing at a location offset from the axis; and (e) a counterweight mounted to the housing at a location offset from the axis and diametrically opposed to the compressor to counteract the inertia of the compressor when the housing is rotated.

In the derotation assembly, the counterweight may include multiple segments coupled together to adjust the counterweight. And the counterweight may include one or more bore holes for receipt of fine trim weights.

The motor may be a toroidal motor.

The integrated dewar cooling assembly may be centered in the housing.

The sensor may be an infrared sensor.

The surface of the sensor may be perpendicular to the rotation axis.

The derotation assembly may further include a mounting bracket coupled to the motor that is mountable to a fixed object.

The present invention also provides a mounting arrangement for an imaging sensor having a desired alignment axis. The mounting arrangement includes (a) a mount adjustably mountable in two transverse directions, the transverse directions lying in a common first plane; (b) a bearing mounted to the mount; (c) a housing coupled to the bearing for rotation relative to the mount about a rotation axis; (d) a translation plate adjustably mounted to the housing, the translation plate being adjustable relative to the housing in two transverse directions that lie in a common second plane that is parallel to the first plane; and (e) an imaging sensor connected to the translation plate and mounted in a fixed position relative to the translation plate, with the sensor's alignment axis transverse the first plane and the second plane.

The mounting arrangement may include an integrated dewar cooling assembly that includes a dewar and the sensor, the sensor being mounted in a fixed position in the dewar and the dewar being mounted to the translation plate.

The translation plate may be secured to the housing to align the alignment axis with the rotation axis.

The translation plate may be adjustable in orthogonal directions.

The sensor may be substantially planar and the alignment axis may pass through a center of the sensor and may be perpendicular to the sensor.

The bearing may have an inner race and an outer race rotatable relative to the inner race, the outer race may be mounted to the mount and the inner race may be coupled to the housing.

The mount may be mountable to a fixed object with multiple eccentric bushings and corresponding shoulder bolts, rotation of the eccentric bushings providing the adjustment in the mounting position.

The mounting arrangement may further include a fastener and a through-hole in the mount for securing the mount to a fixed object and fixing the position of the mount relative to the fixed object.

The mount may be an upper mount, the bearing may be an upper mount bearing, and the mounting arrangement may further include a lower mount spaced from the upper mount, and a lower mount bearing mounted to the lower mount, the lower mount bearing having an outer race mounted to the lower mount and an inner race connected to the housing for rotation relative to the outer race; the lower mount being adjustably mounted so that inner races of the upper mount bearing and the lower mount bearing rotate about the rotation axis.

The housing may further include a compressor mounted to the housing at a position radially offset from the rotation axis, and a counterweight mounted to the housing at a location diametrically opposite the compressor, the counterweight having approximately the same mass as the compressor and its contents.

The housing may further have a through-hole and the translation plate has an elongated slots that generally aligns with the through-hole in the housing for a receipt of an adjustment tool having an eccentric portion at a distal end for the purpose of adjusting the position of the translation plate relative to the housing.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

Figure 1:
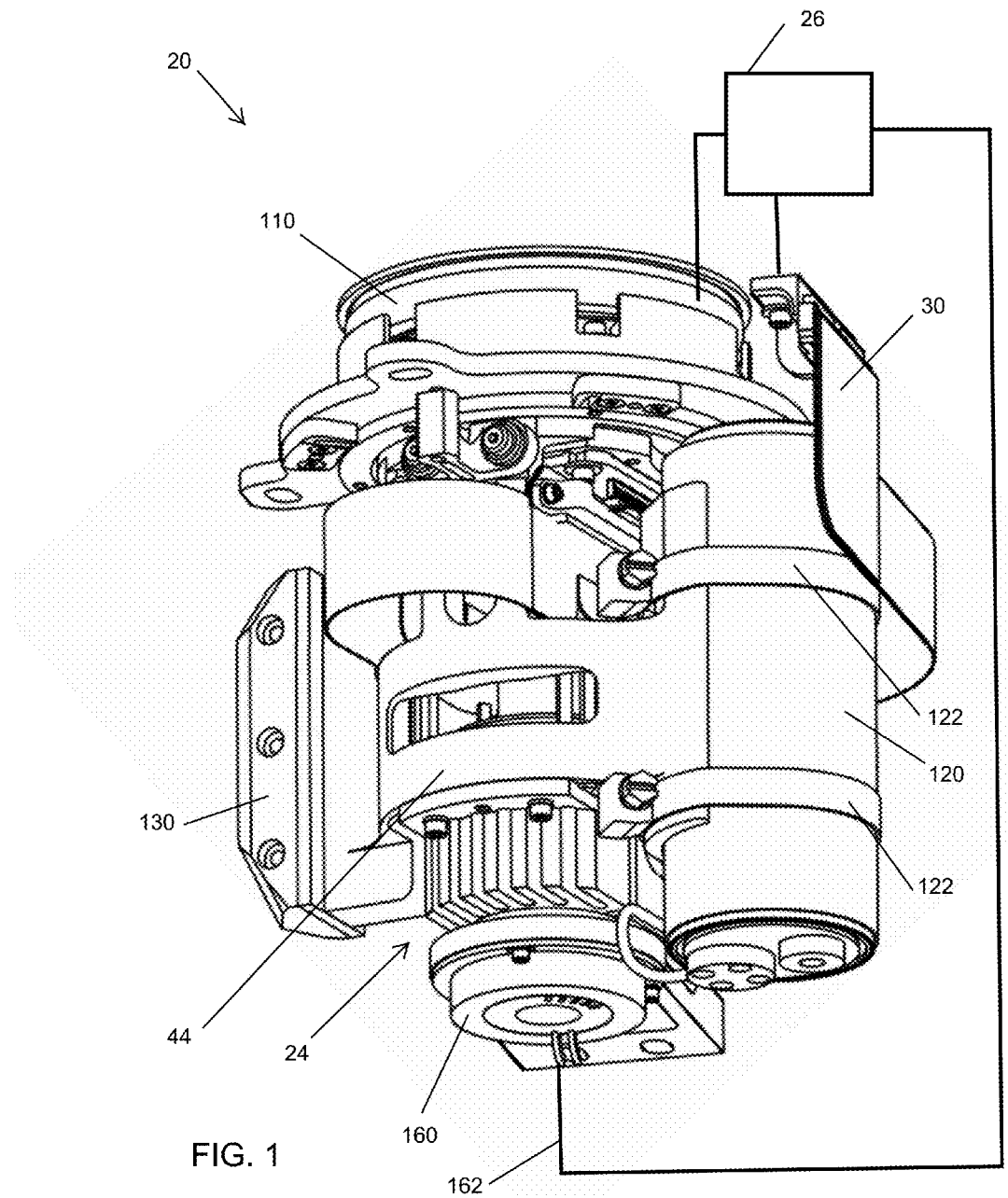
FIG. 1 is partially schematic perspective view of an exemplary derotation assembly.
Figure 2:
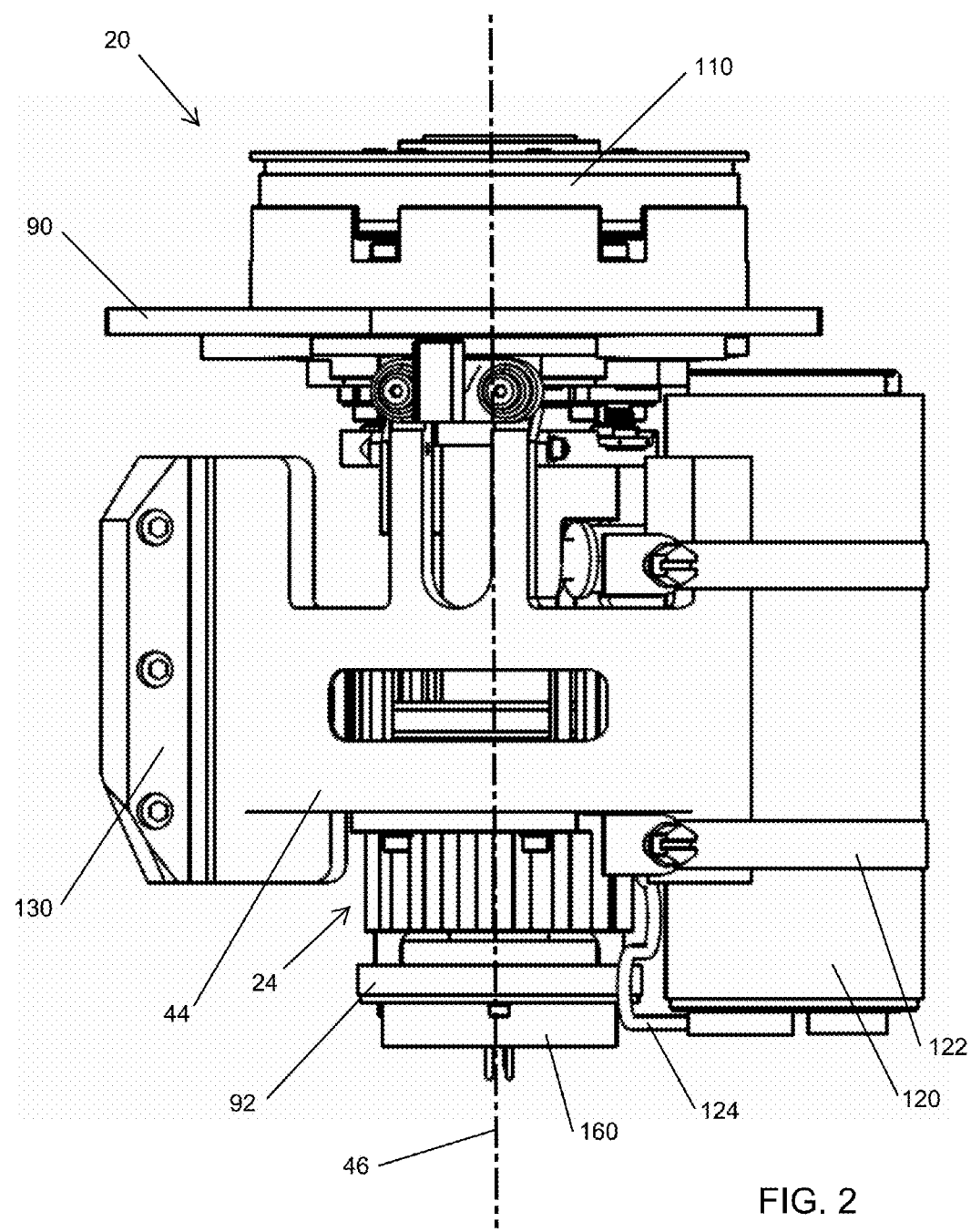
FIG. 2 is an elevation view of the derotation assembly.
Figure 3:
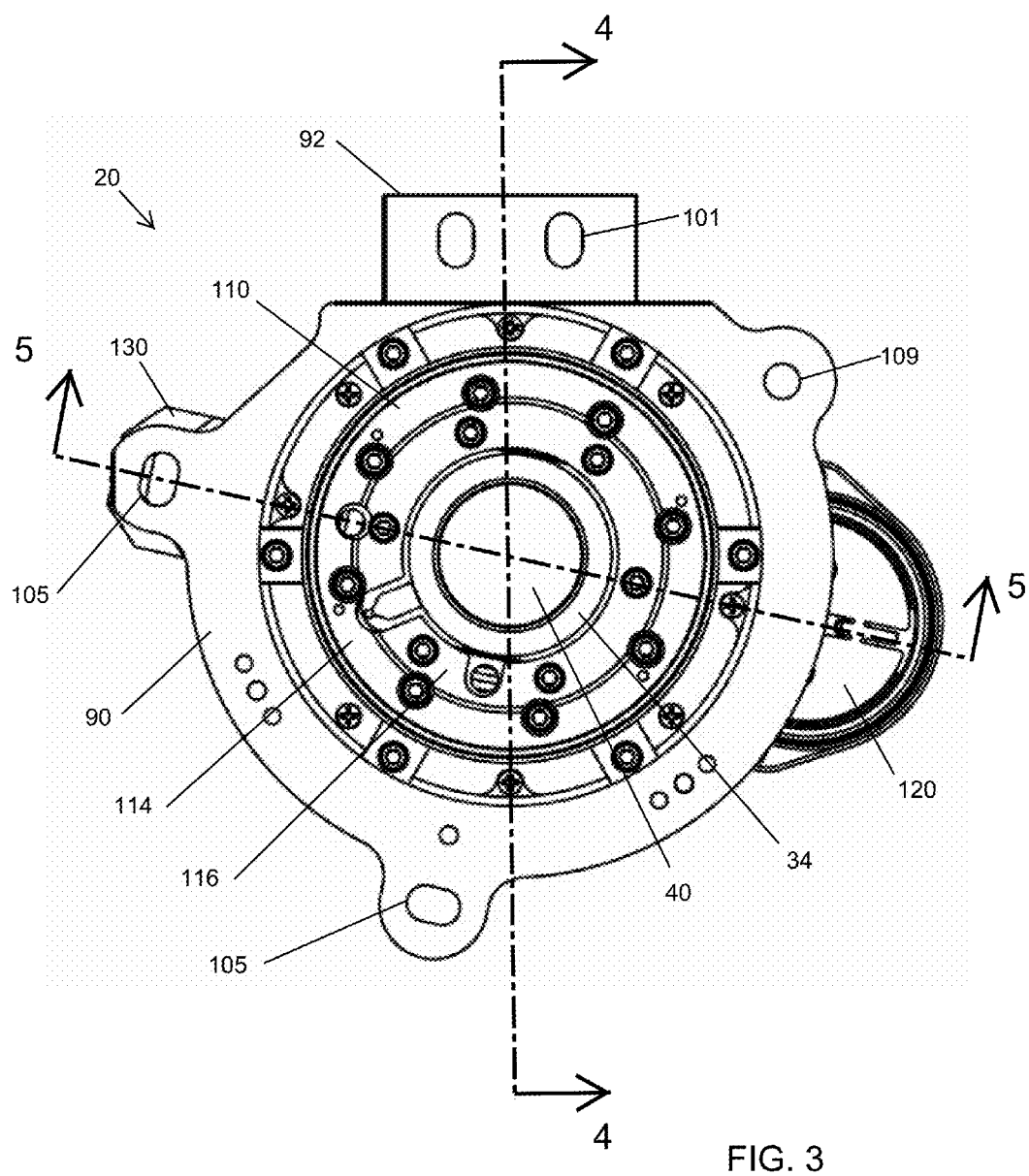
FIG. 3 is a top view of the derotation assembly.
Figure 4:
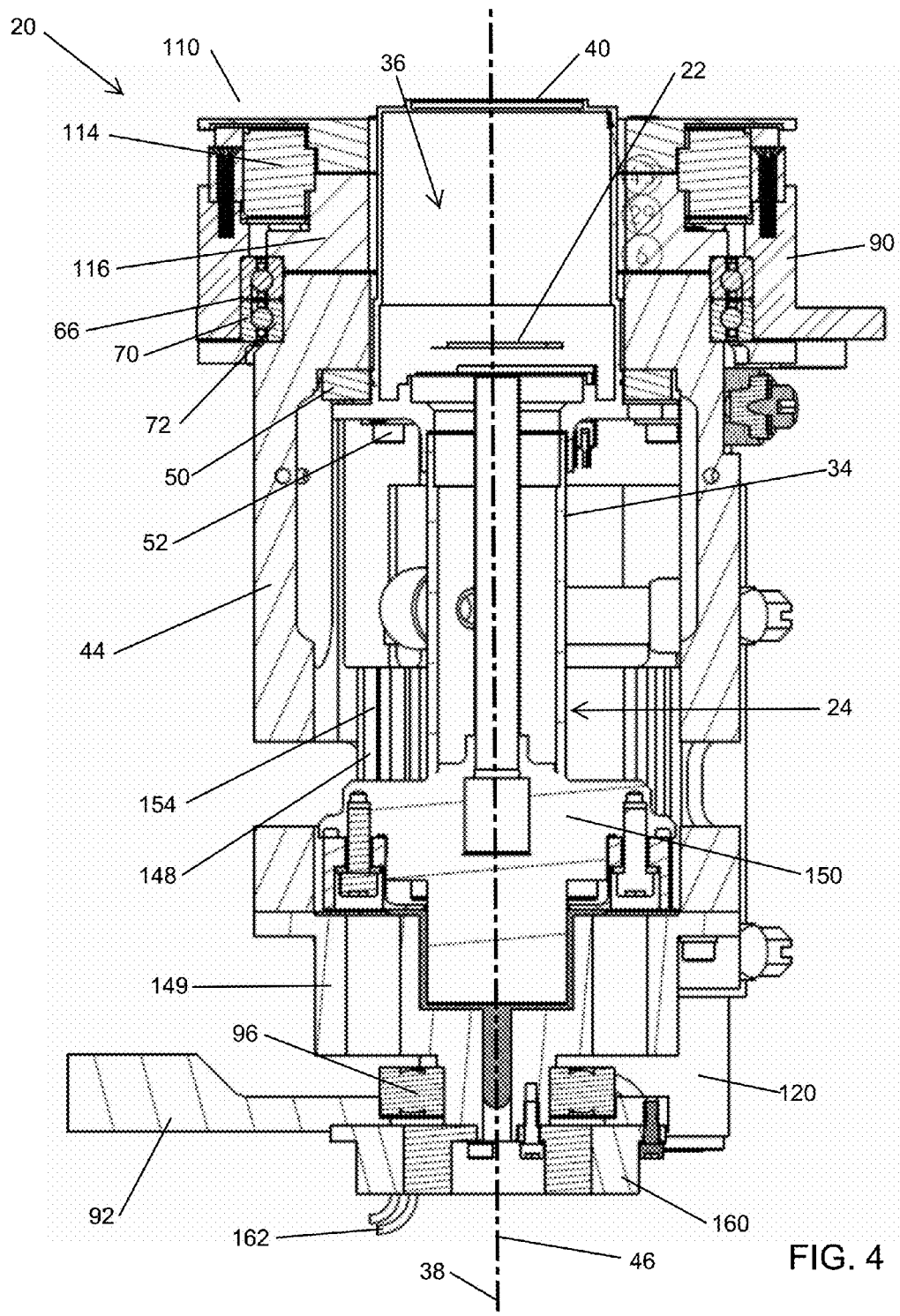
FIG. 4 is a cross-sectional elevation view of the derotation assembly as seen along lines 4-4 of FIG. 3.
Figure 5:
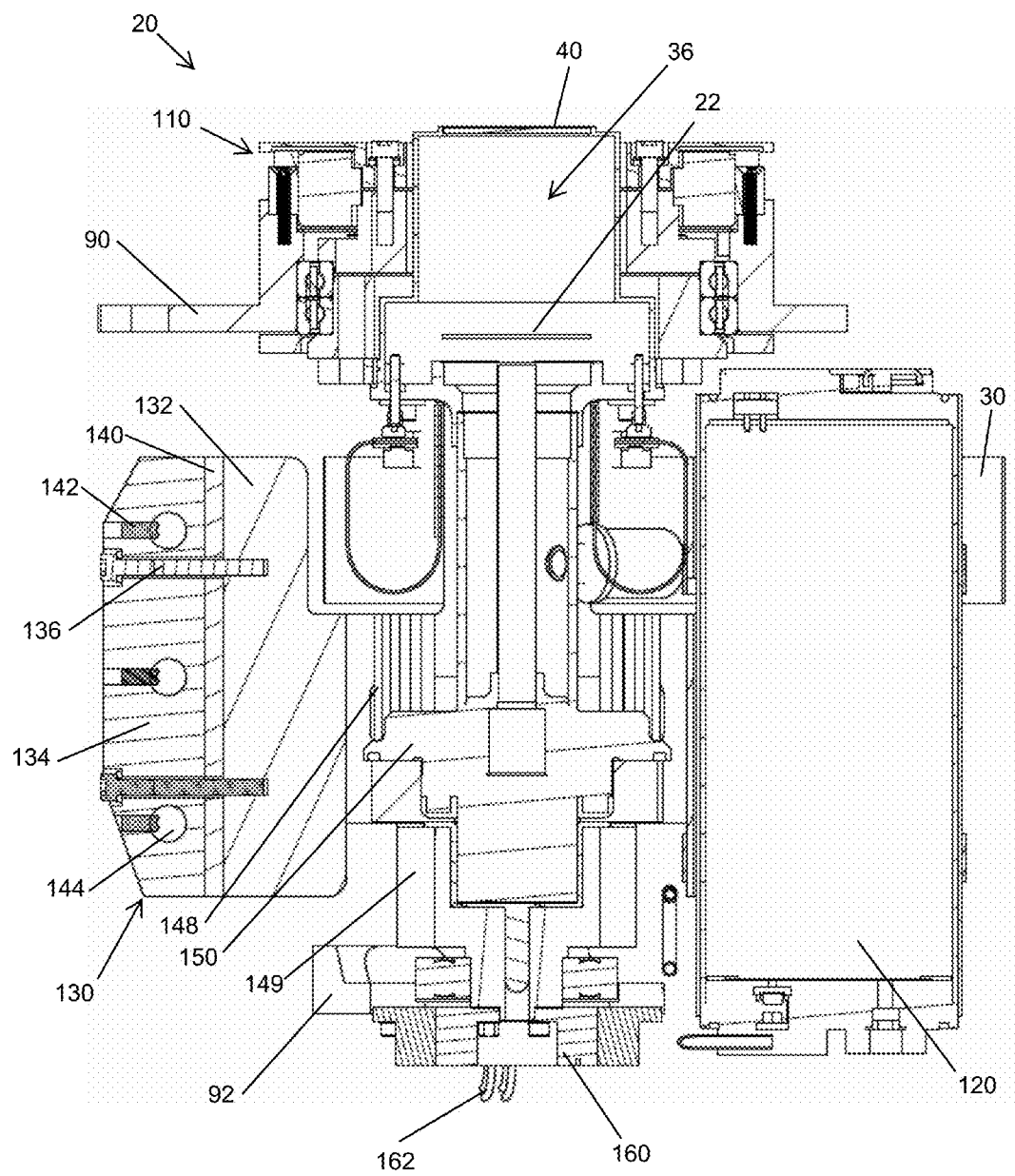
FIG. 5 is a cross-sectional perspective view of the derotation assembly as seen along lines 5-5 of FIG. 3.
Figure 6:
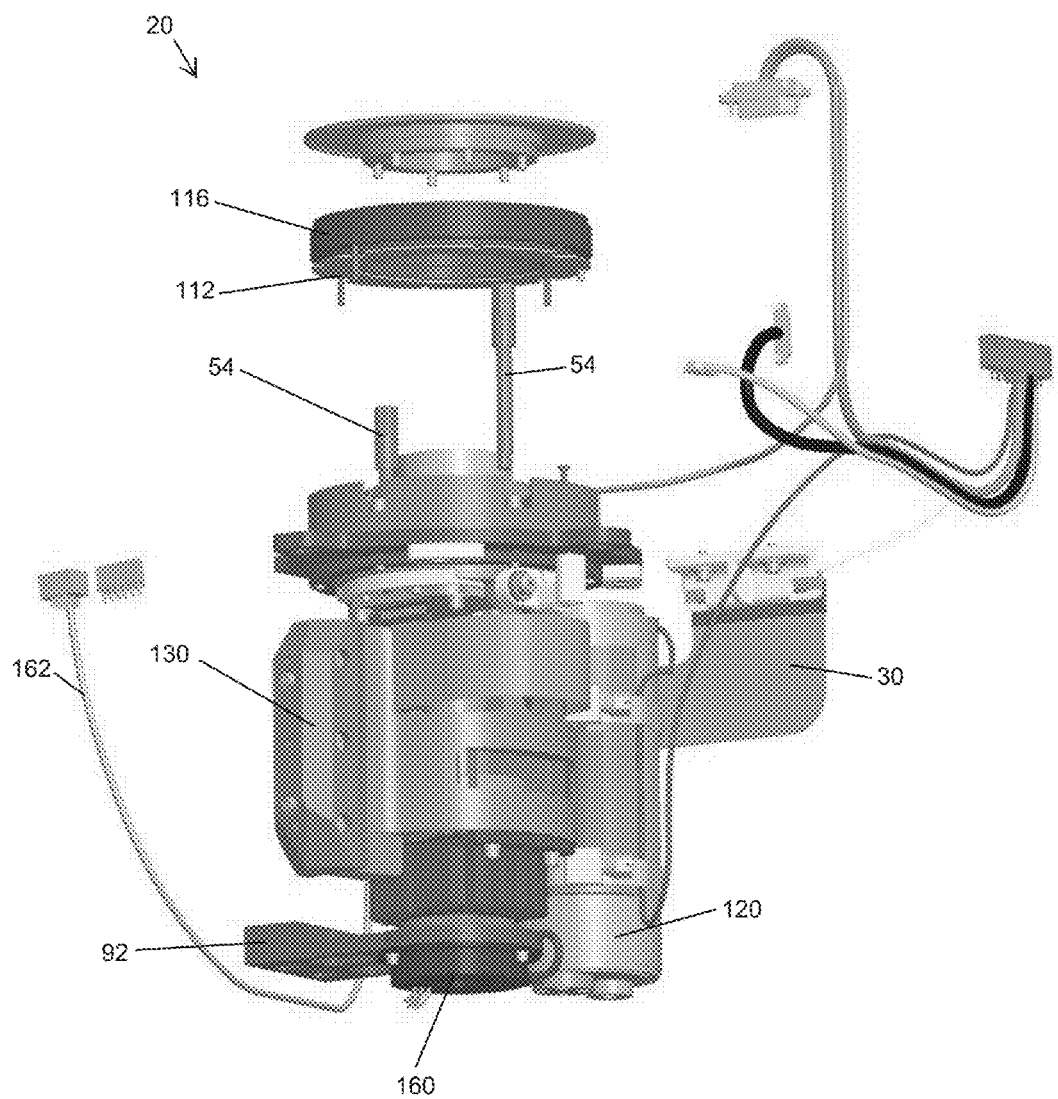
FIG. 6 is a perspective view of the derotation assembly with a portion removed to provide access for adjustment tools.
Figures 7, 8:
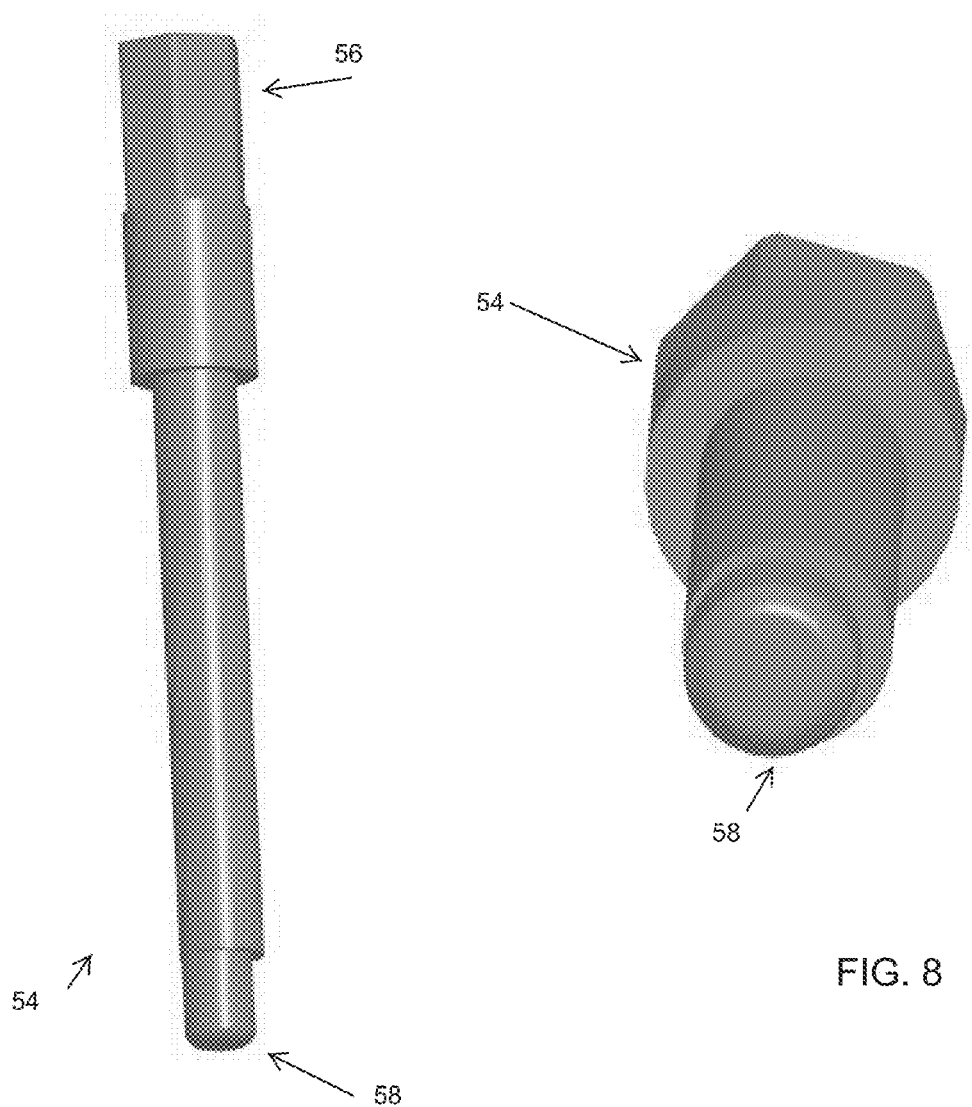
FIG. 7 is a side perspective view of an adjustment tool shown in FIG. 6.
FIG. 8 is an end perspective view of the adjustment tool shown in FIG. 7.
Figure 9:
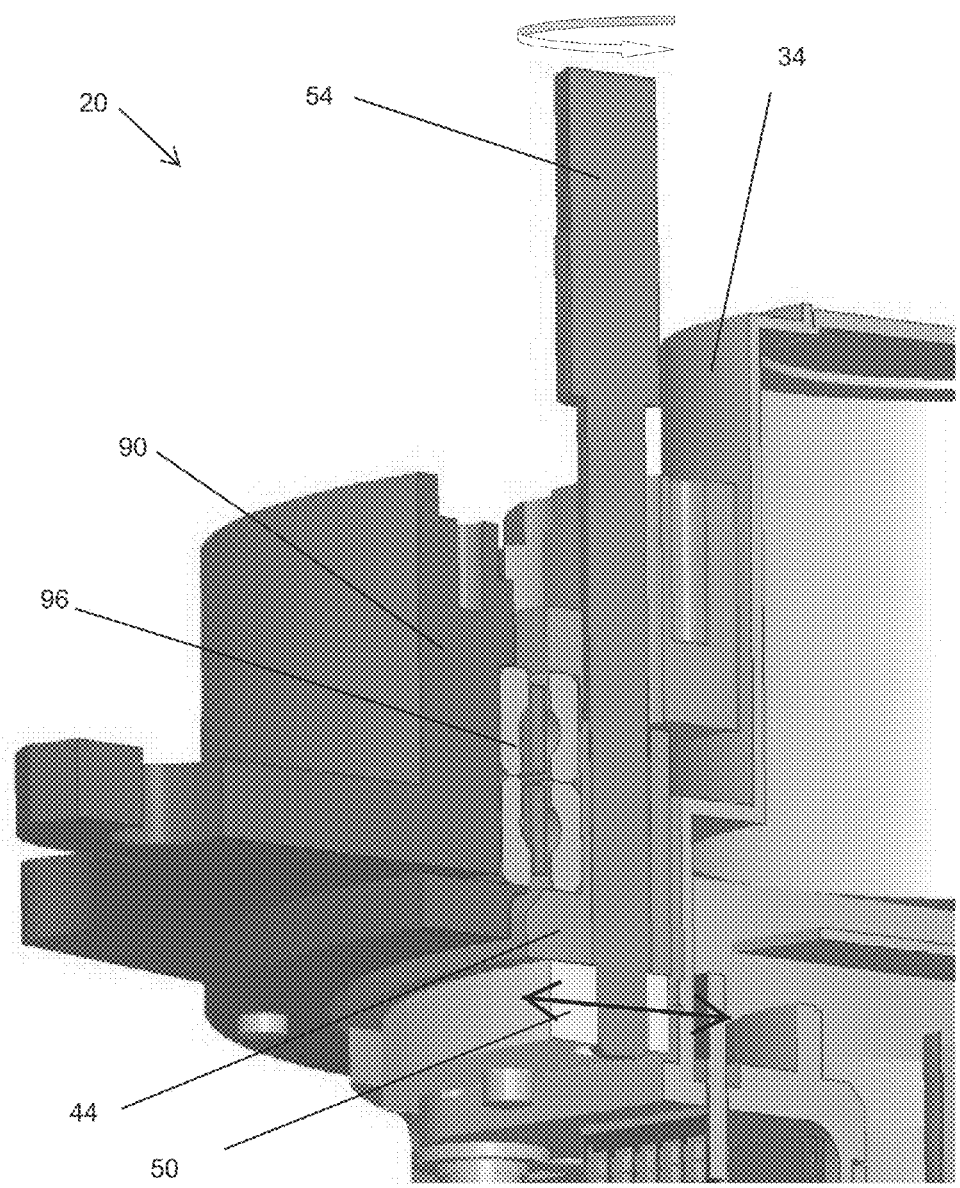
FIG. 9 is an enlarged cross-sectional perspective view of the derotation assembly and an adjustment tool.

The present invention provides a scanning sensor derotation assembly (also referred to as the derotation assembly) that facilitates maintaining a consistent field of view while the derotation assembly is moving relative to a field of view, such as when the derotation assembly is mounted on a vehicle like an airplane or a ship, and an associated mounting arrangement and method. Toward that end, the derotation assembly enables precise mounting of the sensor, improved heat transfer, and rotational-inertia compensation.

Referring now to the drawings in detail, and initially to FIGS. 1 to 5, an exemplary derotation assembly 20 is shown and generally will be described in the order of assembly, from the inside out. The derotation assembly 20 includes an imaging sensor 22, such as an sensor for detecting infrared images, incorporated into an integrated dewar cooling assembly 24. The sensor 22 is electronically coupled to a controller 26, which may include a processor having an associated memory and program instructions, via a sensor cable 30, such as the illustrated ribbon cable.

The integrated dewar cooling assembly 24 (also referred to as the dewar assembly) includes a dewar 34 and the sensor 22 mounted in a sealed chamber 36 in the dewar 34. The sensor 22 is mounted in a fixed position relative to the dewar 34. Some sensors, such as infrared sensors, may require or perform better when cooled below ambient temperature. The dewar 34 is a double-walled vessel, typically of metal or silvered glass, with a vacuum between the walls, that is used to hold a fluid coolant, such as liquid nitrogen, at well-below-ambient temperature. The coolant keeps the sensor 22 and its immediate surroundings cooler than the ambient temperature outside the dewar 34, thereby improving the sensor's imaging capabilities. The illustrated dewar 34 has an elongated shape that extends along a longitudinal axis 38.

At a proximal end of the dewar 34 the sealed chamber 36 has a window 40 that provides access for and may define an aperture to the sensor's field of view. The window 40 can be planar or curved and may be treated to provide desired optical properties. The sensor 22 and the window 40, as well as any other optical elements coupled to the dewar assembly 24 between the sensor 22 and the field of view, form part of an optical assembly. The sensor 22 generally captures an image of a desired field of view most efficiently when the center of the sensor 22 lies on an alignment axis aligned with a center of the desired field of view. In the illustrated embodiment the sensor 22 is substantially planar and the alignment axis passes through a center of the sensor 22 and is perpendicular to the sensor 22. The sensor 22 is securely mounted in the dewar 34 so that the longitudinal axis 38 of the dewar 34 passes through the center of the sensor 22, and thus the alignment axis is coincident with the longitudinal axis 38 of the dewar 34. That longitudinal axis 38 is then aligned with an axis about which the dewar assembly 24 is rotatable. Integrated dewar cooling assemblies are commercially available from Teledyne Judson Technologies of Montgomeryville, Pa., U.S.A., for example.

The derotation assembly 20 also includes a housing 44 within which the dewar assembly 34 is centrally mounted for rotation about a rotation axis 46 that generally will be aligned with the center of the sensor 22, and thus also with the longitudinal axis 38 of the dewar 34 in the illustrated embodiment. The housing 44 is relatively open to facilitate heat removal from the dewar assembly 24 while also providing a support frame for the dewar 34 and associated components, and thus alternatively may be referred to as a frame as well as a housing. A portion of the housing 44 extends circumferentially around the dewar assembly 24.

An end portion of the housing 44 is mounted to a fixed object, such as a frame of a vehicle, through a mounting arrangement that allows the housing 44, and thus the sensor 22, to rotate about the rotation axis 46. The derotation assembly 20 provides a mounting arrangement for the sensor 22 that allows for a two-stage alignment process to radially align the center of the sensor 22 with the rotation axis 46. The mounting arrangement includes (a) a translation plate 50 adjustably mounted to the housing 44, (b) a bearing 66, and, (c) a mount 90 adjustably mountable in two transverse directions that lie in a common first plane. The bearing 66 is mounted to the mount 90, and the housing 44 is coupled to the bearing 66 for rotation relative to the mount 90 about the rotation axis 46. The translation plate 50 is adjustable relative to the housing 44 in two transverse directions that lie in a common second plane that is parallel to the first plane. And the imaging sensor 22 is connected to the translation plate 50 and mounted in a fixed position relative to the translation plate 50 via the dewar 34.

The dewar assembly 24 is mounted to the housing 44 through the translation plate 50, which is positioned between the dewar assembly 24 and the housing 44, and more particularly, from the dewar 34 being mounted to the translation plate 50. The translation plate 50 provides an adjustable mounting arrangement between the dewar assembly 24 and the housing 44 that allows the position of the sensor 22, generally the center of the sensor 22, to be adjusted along a direction within a plane perpendicular to the axis of rotation 46 to align the sensor 22 with the rotation axis 46. The translation plate 46 is affixed to the dewar assembly 24, specifically the outer surface of the dewar 34, and is attached to the housing 44 with a plurality of fasteners 52, such as screws, four of which are used to hold the translation plate 50 to the housing 44 in the illustrated embodiment. Once the dewar assembly 24 is aligned with the housing 44, the fasteners 52 are employed to fix the relative positions of the dewar assembly 24 and the housing 44.

An exemplary process or method of adjusting the position of the dewar assembly 24 relative to the housing 44 will be described with reference to FIGS. 6 to 10. The translation plate 50 has several openings therein for adjusting the position of the translation plate 50 relative to the housing 44 and for affixing the translation plate to the housing 44. At least one opening has an elongated shape that forms a slot 53 that allows the translation plate 50 to be moved along a length of the slot 53 before being fixed in a desired position. In this method, a removable adjustment tool 54, or multiple adjustment tools, may be used to adjust the position of the dewar assembly 24 relative to the housing 44.

The illustrated adjustment tools 54 have an elongate shape with a faceted proximal end 56 for engagement by another tool, and an eccentric 58 on a distal end opposite the proximal end that is offset from an axis of rotation of the tool 54. The eccentric 58 is received in a through-hole or passage through the housing 44 and in a slot 53 in the translation plate 50 against which the eccentric 58 can act as the tool 54 is rotated. The eccentric 58 and the slot 53 act as a cam to adjust the position of the translation plate 50 in a direction parallel to the length dimension of the slot 53. The illustrated translation plate 50 includes two slots 53 that have length dimensions that extend in transverse directions in a common plane, more particularly orthogonal "X" and "Y" directions. This arrangement facilitates adjusting the position of the dewar assembly 24 during maintenance or after complete assembly, if needed.

Figure 10:
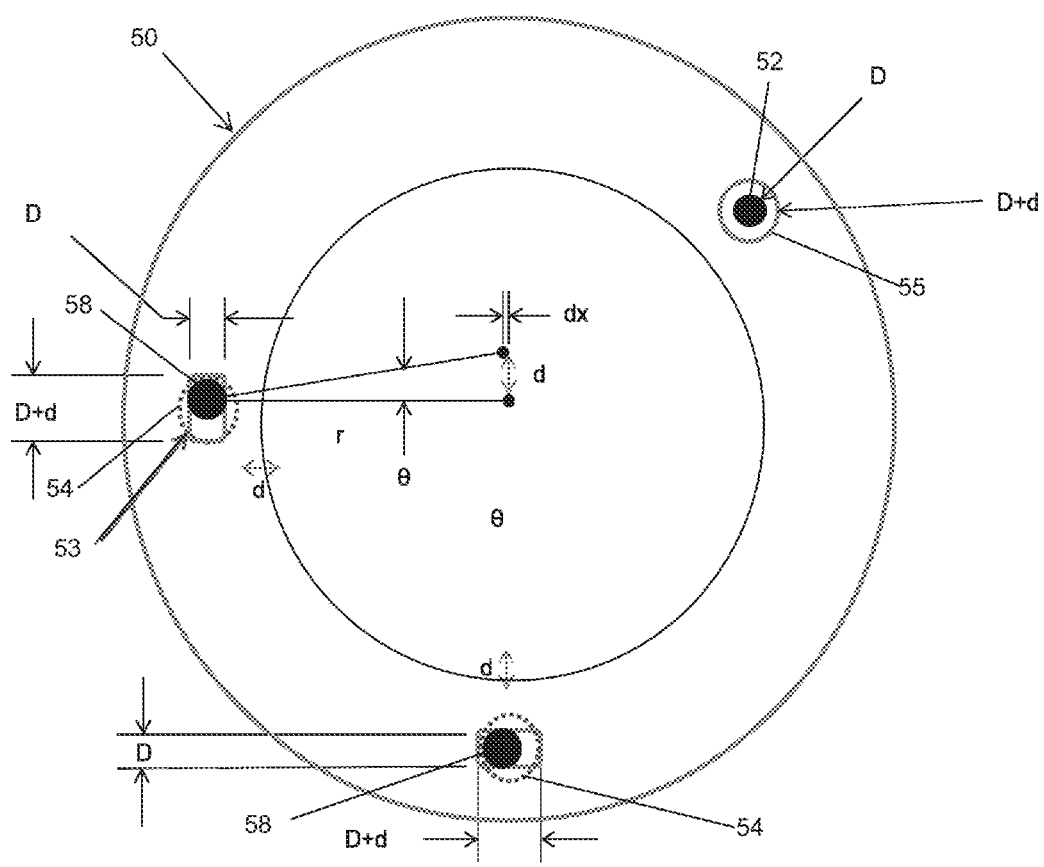
FIG. 10 is a schematic plan view of an adjustment plate portion of the derotation assembly and the adjustment tool.

In the example shown in FIG. 10, each slot 53 has a width D and a length D+d. The eccentric 58 at the end of the tool 54 has a diameter just less than D for receipt in the slot. As the eccentric 58 rotates its cam-like action drives against the edge of the slot and moves the translation plate 50 in a direction transverse the length dimension of the slot 53. So, a slot 53 with a length dimension in the "Y" direction would be used to move the translation plate in the "X" direction as the eccentric 58 is rotated. The translation plate 50 can be adjusted by a distance, d, due to the offset of the eccentric 58 to the axis of rotation of the tool 54 and the length of the other slot 53 in the translation plate 50 in that direction. In the example shown in FIG. 10, if the diameter of the eccentric 58 and the width of the slot 53 are about D=0.635 cm, the offset of the eccentric is d=0.061 cm (and thus the length of the 53 is D+d=0.696 cm), and the radius of the slot 53 to the center of the translation plate 50 is r=6.35 cm. Thus the adjustment amount in the lateral direction (parallel to the length direction) (d=0.061 cm) is much greater than the distance the eccentric 58 moves in the longitudinal direction (perpendicular to the length dimension) (dx=0.00058 cm).

Once the dewar assembly 24 is properly aligned, the fasteners 52 can be employed to fix the dewar assembly 24 in place relative to the housing 44 and the translation plate 50. The openings 55 (one shown in FIG. 10) in which the securing fasteners 52 are inserted typically are enlarged to accommodate the adjustments in the position of the translation plate 50. Once the dewar assembly 24 is fixed in position relative to the housing 44, the dewar assembly 24 does not rotate relative to the housing 44. The housing 44 and the dewar assembly 24 (and the translation plate 50) rotate together as a single unit.

The housing 44 is mounted to the bearing 66, which has an outer race 70 and an inner race 72 rotatable relative to the outer race 70. The housing 44 is affixed to the inner race 72 for rotation relative to the outer race 70. Adjustment of the dewar assembly 24 relative to the housing 44 may occur after the housing 44 is mounted in the bearing 66, in which case the adjustment of the dewar assembly 24 relative to the housing 44 also centers the sensor 22 relative to the axis of rotation of the inner race 72 of the bearing 66. The translation plate 50 thus is configured for adjusting a relative position of the sensor 22, and the optical assembly, relative to the inner race 72 of the bearing 66 within a plane perpendicular to the desired axis of rotation 46. Accordingly, the translation plate 50 provides an "inside-the-bearing" adjustment between the dewar assembly 24 and the housing 44.

Figure 11:
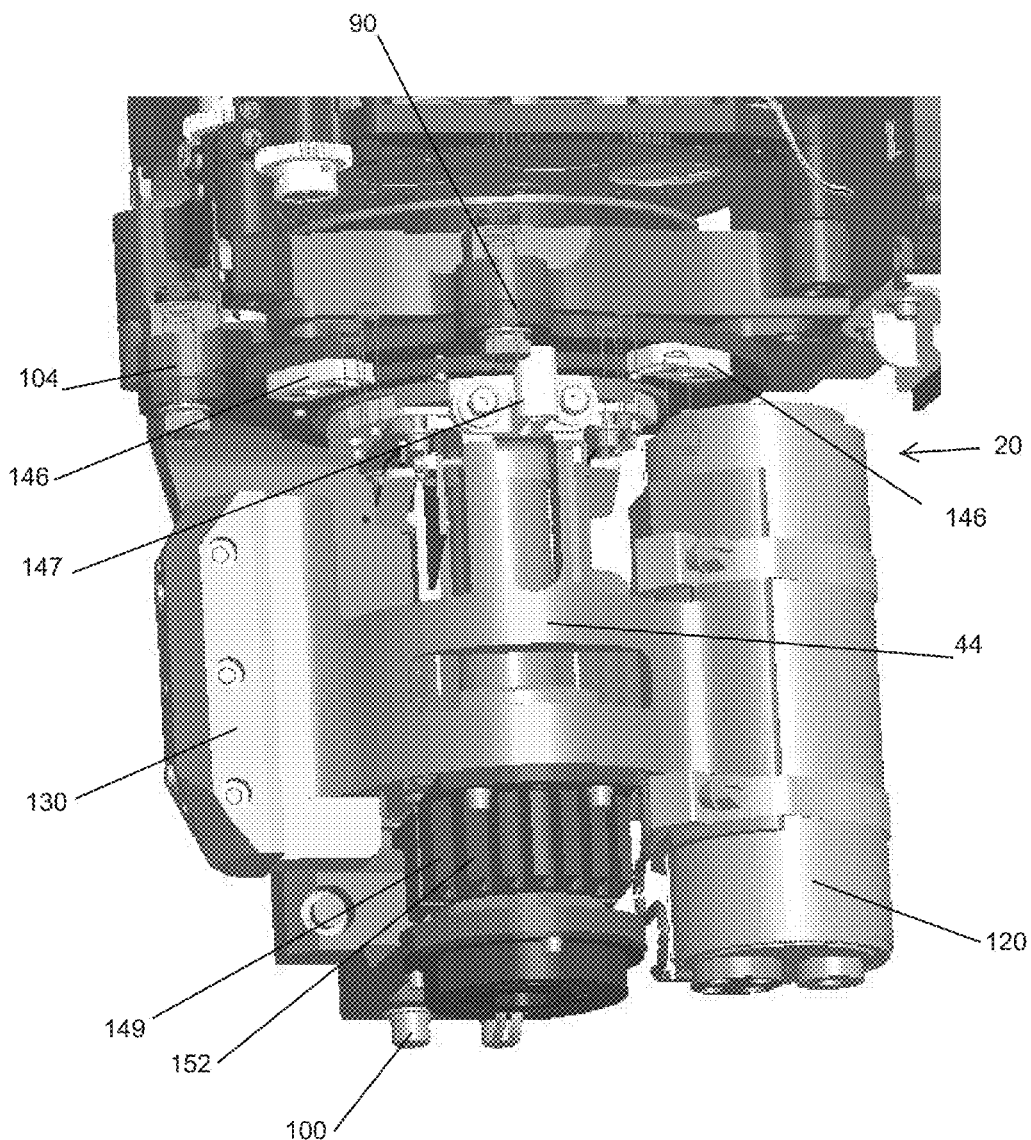
FIG. 11 is a perspective view of the derotation assembly with mounting bolts securing the assembly to a fixed object shown in phantom lines.
Figure 12:
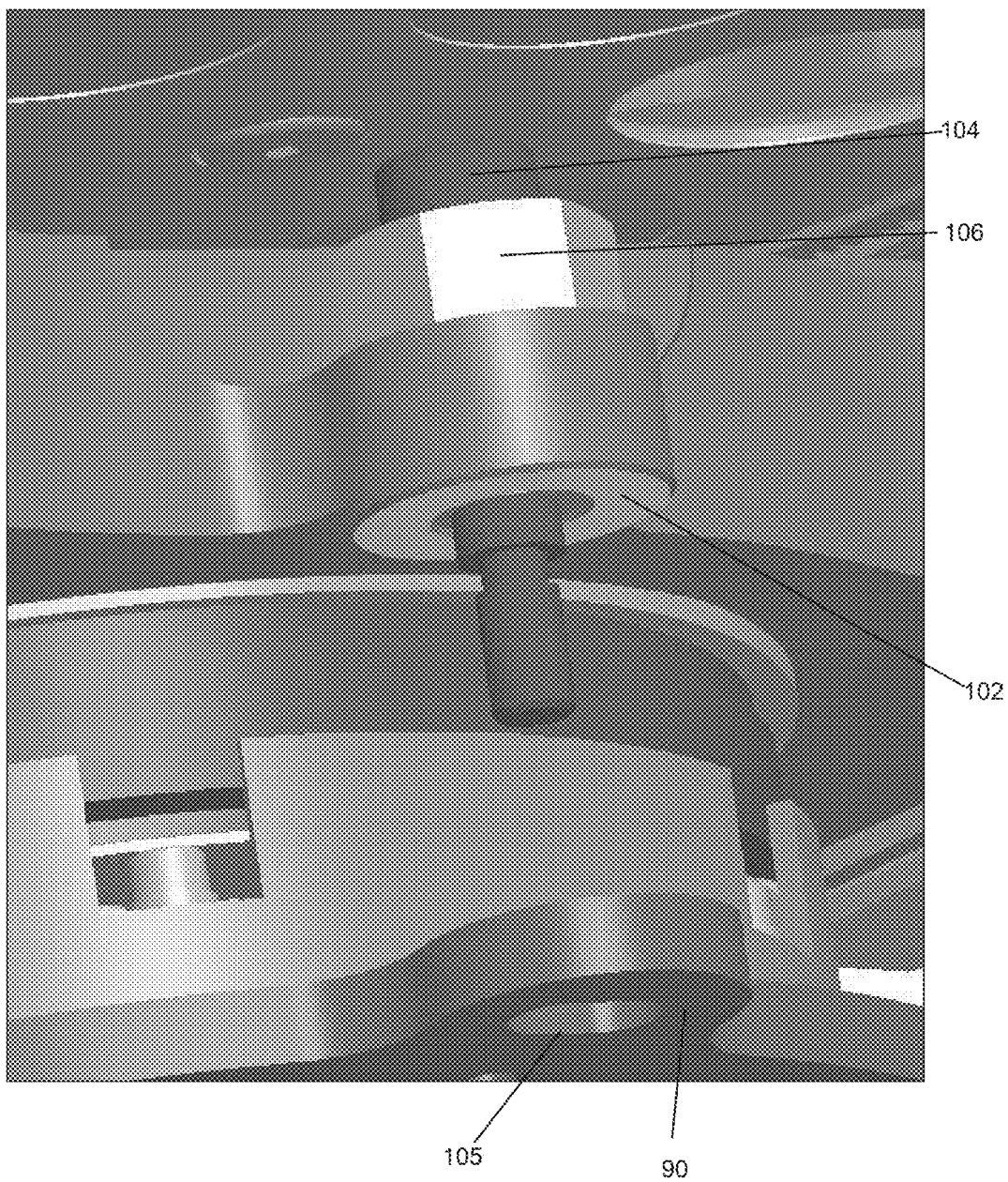
FIG. 12 is an enlarged perspective view of a mounting bolt and a portion of the derotation assembly to which the mounting bolt will be affixed.

Returning to FIGS. 1 to 5 and also considering FIGS. 11 and 12, the housing 44 is separately coupled to a fixed object, such as a frame of a vehicle, through the mount. The mount is a bracket for securing the rotatable housing 44 to a fixed object, thereby providing a structure to support the rotatable housing 44 and relative to which the housing 44 can rotate. The illustrated mount includes two separate portions, an upper mounting bracket 90 (referred to simply as the upper mount) coupled to the housing 44 near a proximal end of the dewar assembly 24, and a lower mounting bracket 92 (referred to as the lower mount) spaced from the upper mount 90 and supporting a distal portion of the dewar assembly 24 via a bearing 96 (distinguished as the lower mount bearing) interposed between the lower mount 92 and the distal end of the dewar assembly 24. Thus the bearing 66 can be referred to as the upper mount bearing 66. The outer race 70 of the upper mount bearing 66 is secured to the upper mount 90, and the inner race 72 is coupled to the housing 44.

The upper mount 90 and the lower mount 92 each have off-center mounting holes for an outside-the-bearing alignment adjustment, described below. Bolts 100, as in the illustrated embodiment, or other fasteners, inserted into enlarged through-holes 101 in the lower mount 92 allow the lower mount 92 to be secured in place after the dewar assembly 24 has been positioned relative to the housing 44, and the housing 44 has been secured to the upper mount 90.

The upper mount's adjustment is similar to the adjustment of the translation plate 50 but it does not use the eccentric adjustment tools 54. Instead, eccentric bushings 102 and shoulder bolts 104 provide independent translation of the upper mount 90 relative to the fixed object to which it is to be secured in transverse, or orthogonal X- and Y-directions (typically but not necessarily perpendicular directions) in a common second plane. The shoulder bolts 104 are circumferentially spaced apart in tangentially-elongated openings or slots 105. The eccentric bushings 102 each have a faceted (such as hexagonal) head portion 106 that is accessible to rotate the bushings 102 independently or together as needed, whereby rotation of the eccentric bushings 102 provides the adjustment in the mounting position. The shoulder bolts 104 are received in the slots 105, and rotating the bushings 102 drives the side of the bolt 104 against the side of the slot 105, thereby moving the upper mount 90 in a direction transverse the length of the slot. The illustrated embodiment also includes a separate fastener 110 in the form of a screw without a bushing, spaced from the shoulder bolts 104 to secure the upper mount 90 in a third location in a through-hole 109 in the upper mount 90 and to help fix the position of the upper mount 90 once the adjustment is complete.

In summary, the derotation alignment process occurs in two stages. In the first stage, an inner adjustment is performed to center the sensor 22 within the upper mount bearing 66 so that the center of the sensor 22 (and thus the field of view) corresponds with the center of the bearing 66 (aligning the center of the field of view with the axis of rotation 46). To gain access, some components may need to be removed to permit the eccentric adjustment tool 54 to access the translation plate 40. The eccentric adjustment tools 54 are inserted through the housing 44 and into openings in the translation plate 40. Rotating one tool 54 at a first location causes a translation in a first direction, generally parallel to the plane of the translation plate 40. Rotating the other tool 54 at a second location causes a translation in a second direction transverse to and preferably perpendicular to the first direction, but in the same plane. The first direction and the second direction can be referred to as the X-direction and the Y-direction, respectively, both lying in the X-Y plane. The dewar assembly 24 and the housing 44 are adjusted to align the alignment axis of the sensor 22 with the center of the bearing 66. Once this inner adjustment is complete, screws or other fasteners 52 are tightened down to fix the position of the sensor 22 (via the dewar assembly 24) relative to the housing 44.

In the second stage, the outer adjustment, the housing 44 is coupled to a fixed object, such as a frame of a vehicle, using eccentric bushings 102 and shoulder bolts 104, or cam bolts, that enable another translating adjustment. A first cam bushing 102 adjusts the position of the upper mount 90 in a first direction (X-direction), and a second cam bushing 102 adjusts the position of the upper mount 90 in a second (Y) direction transverse to the first direction but in the same plane. The adjustment is done while viewing a target with the sensor 22 to put the target image at the center of the sensor's field of view. For a twenty-micron imaging sensor, with approximately 640×512 pixels, the axis of rotation 46 desirably is within half a pixel of the center of the sensor 22.

To effect the sensor's rotation about the rotation axis 46, the derotation assembly 20 also includes a motor 110, such as the illustrated direct drive toroidal motor, mounted to the upper mount 90 and coupled to the housing 44. An electromagnetic interference (EMI) shield 112 is mounted below the motor 110 to minimize or eliminate electromagnetic interference from the motor 110. The motor 110 has a stationary portion (sometimes referred to as a hub) 114 and a movable portion 116, both of which form concentric circles with an open center through which the axis of rotation 46 passes. The open center of the motor 110 also provides access to the window 40 in the dewar assembly 24, and thus the sensor 22. The stationary portion 114 of the motor 110 is affixed to the upper mount 90, and the movable portion 116 of the motor 110 engages the housing 44. This is a direct connection, without any intervening gears, thereby avoiding problems such as gear train backlash associated with imperfectly-meshing gear teeth.

When the upper mount 110 is secured to a fixed object, relative motion between the elements of the motor 110 rotate the housing 44 and the dewar assembly 24 about the rotation axis 46 relative to the upper mount 90. In the illustrated embodiment, at least the movable portion 116 of the motor 110 and the EMI shield 112 must be removed to provide access for the eccentric adjustment tools 54 to adjust the position of the dewar assembly 24 relative to the housing 44.

The derotation assembly 20 further includes a compressor 120 mounted to the housing 44, radially offset from the axis of rotation 46 and spaced from the dewar assembly 24. In the illustrated embodiment, the compressor 120 is secured to the housing 44 with a pair of hose clamps 122. The compressor 120 is fluidly-coupled to the dewar 34 to provide a cooling fluid, referred to as coolant, to the dewar 34 and to compress heated coolant received from the dewar 34 before returning it to the dewar 34. The coolant is circulated between the dewar 34 and the compressor 120 via coolant tubing 124 that provides a fluid passage. The coolant tubing 124 typically is flexible to facilitate connecting the compressor 120 to the dewar 34 and to accommodate any deformation or other movement of the housing 44 or dewar assembly 24 relative to the compressor 120 during rotation.

To counteract the inertia of the compressor 120 when the housing 44 is rotated, a counterweight 130 is mounted to the housing 44 at a location radially offset from the rotation axis 46, spaced from the dewar assembly 24, and diametrically opposed to the compressor 120. The mass of the counterweight 130 is adjustable to neutrally balance the housing 44 and the compressor 120 so that the housing 44 rotates without or with minimal inertial torque. Thus the counterweight 130 generally has approximately the same mass as the compressor 120 and its contents.

The illustrated counterweight 130 has multiple segments, and segments can be added or removed to accurately counter the mass of the compressor 120. In the illustrated embodiment the counterweight 130 includes a mass or weight 132 that is incorporated into and thus is permanently integrated into the housing 44, and a main weight segment 134 that is secured to the housing 44 adjacent the weight 132 by a pair of fasteners 136, such as bolts, that permit the segment 134 to be changed if necessary. A trim weight 140 is sandwiched between the housing 44 and the main weight segment 134. A fine trim weight 142 is an additional option that may be added in bore holes 144 in the main weight 134. The bore holes 144 can be filled with threaded weights or a threaded plug can be inserted to hold a weight in the bore hole 144. The threaded plugs and the bolts 136 also add their mass to the counterweight 130. The counterweight 130 improves the reliability of the derotation assembly 20 more than flexible tubing alone or a rotatable fitting for the tubing as alternative arrangements.

The rotation of the dewar assembly 24 and the housing 44 is limited by a pair of stop blocks 146 secured to the upper mount 90 and a stop 147 mounted to the housing 44 between the stop blocks 146 to limit the rotation of the housing 44. In an exemplary embodiment, the stop 147 and the stop blocks 146 cooperate to limit the rotation of the dewar assembly 24 and the housing 44 to about thirty degrees of travel, forward or reverse from a central position (a total of sixty degrees of travel). This amount of rotation generally is sufficient, and allows the controller 26 to be in a fixed, non-rotating position, rather than requiring the controller 26 to rotate with the sensor 22, and thereby preventing the need for a complicated solution to prevent the electrical cables connected to the controller from becoming entangled.

The derotation assembly 20 also includes a pair of heatsinks 148 and 149 coupled to or incorporated into the dewar assembly 24 to help dissipate heat from the dewar 34 passively, without the energy required for the compressor 120. The illustrated heatsinks are mounted to a distal end of the dewar 34 opposite the window 40 at the proximal end, and include a lower heatsink portion 144 and an upper heatsink portion 146. The illustrated dewar 34 has an end cap 150 at a distal end, removed from the sensor 22 and the window 40, that has a relatively large mass and an outwardly-extending flange to help control and dissipate heat generated in the dewar 34. This flanged end cap 150 may be referred to as a hot end cap, and the heatsinks 148 and 149 sandwich the hot end cap 150 to passively transfer heat out of the dewar 34 through conduction and convection. The lower heatsink 148 has a relatively large mass in close contact with a corresponding surface at a distal end of the dewar 34 for transferring heat from the dewar 34 to the lower heatsink 148 and then the environment. In the illustrated embodiment, the lower heatsink 148 has a plurality of longitudinally-extending fins 152 that also extend radially outward from the central mass. While the illustrated fins 152 are parallel to a longitudinal axis of the dewar 34, but other shapes or designs of fins or other protuberances may be equally or more suitable for a given application.

The upper heatsink 149 has a surface in close contact with a circumferential portion of the dewar 34 proximally located relative to the lower heatsink 148 but on the other side of the flanged end cap 150. A plurality of rod-like fins 154 extend parallel to the rotation axis 46 and extend axially into a space in the housing 44 between the dewar 34 and the counterweights 130 and the compressor 120. A thermal heat transfer material may be applied between each heatsink 148 and 149 and an adjacent surface of the dewar 34 to improve the thermal contact and heat transfer. The heatsinks 148 and 149 provide a passive cooling element that assists the compressor 120 and can help to minimize the size and energy requirements of the compressor 120 to maintain the desired coolant temperature. And employing dual heatsinks 148 and 149 adjacent the hot end cap 150 provides multiple paths for the heat to escape the dewar 34, in addition to the active cooling provided by the coolant and the compressor 120.

Finally, the derotation assembly 20 also includes a resolver 160, mounted to a distal end of the dewar assembly 24 for monitoring its rotational position about the rotation axis 46. A forty arc second (194 μrad) resolver, for example, is sufficiently accurate for this assembly. The resolver 160 is electronically coupled to the controller 26 through a flexible electrical cable 162.

The controller 26 is coupled to the upper mount 90 or the housing 44 or the fixed object to which the derotation assembly 20 is coupled, and generally does not need to rotate with the dewar assembly 24. The controller 26 receives data from the resolver 160 and the sensor 22 and controls the motor 110 to maintain the desired orientation of the sensor 22 relative to the field of view. The controller 26 also can be coupled to the sensor 22 to process the image data generated by the sensor 22. In addition, the controller 26 may control the compressor 120, if necessary. If the controller 120 is not coupled to the housing 44, flexible electrical connections or wireless connections may be used to provide the electrical connection as the housing 44 and the dewar assembly 24 rotate relative to the controller 26.

In summary, the foregoing features of the invention provide an assembly 20 that enables precise mounting of the sensor 22, improved heat transfer, and rotational-inertia compensation. An integrated dewar cooler assembly 24 incorporating the sensor 22 is mated to a motorized mount 90 and 110 that is controlled to stabilize the rotation of the scene. The sensor 22 is radially aligned relative to the axis of rotation 46 in two adjustment stages. A first stage of adjustment controls the radial position of the sensor 22 inside a bearing 66. And a second stage of adjustment controls radial translation of the entire assembly 20 outside the bearing 66. Passive heat transfer is accomplished through a pair of heatsinks 144 and 146 that effectively sandwich a hot expander end cap 150 of the dewar 34, providing multiple heat paths. The entire dewar assembly 24 is rotated during operation to stabilize the scene. And the rotating mass of a cooling compressor 120 coupled to the dewar 34 is counter-balanced to avoid torque due to inertia.

Although the invention has been shown and described with respect to a particular embodiment, equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated exemplary embodiment of the invention.

What is claimed is:

1. A scanning sensor derotation assembly, comprising a housing;
an integrated dewar cooling assembly mounted to the housing, the cooling assembly including a sensor mounted in a dewar;
a motor coupled to the housing to rotate the housing and the integrated dewar cooling assembly about an axis that passes through a center of the sensor;
a compressor fluidly coupled to the dewar, the compressor being mounted to the housing at a location offset from the axis; and
a counterweight mounted to the housing at a location offset from the axis and diametrically opposed to the compressor to counteract the inertia of the compressor when the housing is rotated.

2. A derotation assembly as set forth in claim 1, where the counterweight includes multiple segments coupled together to adjust the counterweight.

3. A derotation assembly as set forth in claim 1, where the counterweight includes one or more bore holes for receipt of fine trim weights.

4. A derotation assembly as set forth in claim 1, where the motor is a toroidal motor.

5. A derotation assembly as set forth in claim 1, where the integrated dewar cooling assembly is centered in the housing.

6. A derotation assembly as set forth in claim 1, where the sensor is an infrared sensor.

7. A derotation assembly as set forth in claim 1, where the sensor is perpendicular to the axis.

8. A derotation assembly as set forth in claim 1, comprising a mounting bracket coupled to the motor that is mountable to a fixed object.

9. A mounting arrangement for an imaging sensor having a desired alignment axis, comprising:

a mount adjustably mountable in two transverse directions, the transverse directions lying in a common first plane;

a bearing mounted to the mount;

a housing coupled to the bearing for rotation relative to the mount about a rotation axis;

a translation plate adjustably mounted to the housing, the translation plate being adjustable relative to the housing in two transverse directions that lie in a common second plane that is parallel to the first plane;

an imaging sensor connected to the translation plate and mounted in a fixed position relative to the translation plate, with the sensor's alignment axis transverse the first plane and the second plane;

further comprising an integrated dewar cooling assembly that includes a dewar and the sensor, the sensor being mounted in a fixed position in the dewar and the dewar being mounted to the translation plate.

10. A mounting arrangement as set forth in claim 9, where the sensor is an infrared sensor.

11. A mounting arrangement as set forth in claim 9, where the translation plate is secured to the housing to align the alignment axis with the rotation axis.

12. A mounting arrangement as set forth in claim 9, where the translation plate is adjustable in orthogonal directions.

13. A mounting arrangement as set forth in claim 9, where the sensor is substantially planar and the alignment axis passes through a center of the sensor and is perpendicular to the sensor.

14. A mounting arrangement as set forth in claim 9, where the bearing has an inner race and an outer race rotatable relative to the inner race, the outer race being mounted to the mount and the inner race being coupled to the housing.

15. A mounting arrangement as set forth in claim 9, where the mount is mountable to a fixed object with multiple eccentric bushings and corresponding shoulder bolts, rotation of the eccentric bushings providing the adjustment in the mounting position.

16. A mounting arrangement as set forth in claim 15, comprising a fastener and a through-hole in the mount for securing the mount to a fixed object and fixing the position of the mount relative to the fixed object.

17. A mounting arrangement as set forth in claim 9, where the mount is an upper mount, the bearing is an upper mount bearing, and further comprising a lower mount spaced from the upper mount, and a lower mount bearing mounted to the lower mount, the lower mount bearing having an outer race mounted to the lower mount and an inner race connected to the housing for rotation relative to the outer race; the lower mount being adjustably mounted so that inner races of the upper mount bearing and the lower mount bearing rotate about the rotation axis.

18. A mounting arrangement as set forth in claim 9, where the housing has a through-hole and the translation plate has an elongated slot that generally aligns with the through-hole in the housing for a receipt of an adjustment tool having an eccentric portion at a distal end for the purpose of adjusting the position of the translation plate relative to the housing.

19. A mounting arrangement, for an imaging sensor having a desired alignment axis, comprising:

a mount adjustably mountable in two transverse directions, the transverse directions lying in a common first plane;

a bearing mounted to the mount;

a housing coupled to the bearing for rotation relative to the mount about a rotation axis;

a translation plate adjustably mounted to the housing, the translation plate being adjustable relative to the housing in two transverse directions that lie in a common second plane that is parallel to the first plane;

an imaging sensor connected to the translation plate and mounted in a fixed position relative to the translation plate, with the sensor's alignment axis transverse the first plane and the second plane where the housing further includes a compressor mounted to the housing at a position radially offset from the rotation axis, and a counterweight mounted to the housing at a location diametrically opposite the compressor, the counterweight having approximately the same mass as the compressor and its contents.

* * * * *